United States Patent
Calmon et al.

(10) Patent No.: US 10,388,039 B2
(45) Date of Patent: *Aug. 20, 2019

(54) ACCELERATING DATA-DRIVEN SCIENTIFIC DISCOVERY

(71) Applicant: International Business Machines Corporation, Armonk, NY (US)

(72) Inventors: Flavio du Pin Calmon, White Plains, NY (US); Kush Raj Varshney, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/609,586

(22) Filed: May 31, 2017

(65) Prior Publication Data

US 2018/0350114 A1    Dec. 6, 2018

(51) Int. Cl.
| | |
|---|---|
| *G06T 11/00* | (2006.01) |
| *G06Q 10/00* | (2012.01) |
| *G06T 11/20* | (2006.01) |
| *G06Q 10/06* | (2012.01) |
| *G06Q 20/38* | (2012.01) |

(52) U.S. Cl.
CPC ........ *G06T 11/206* (2013.01); *G06Q 10/0639* (2013.01); *G06Q 20/38* (2013.01)

(58) Field of Classification Search
CPC .................................................. G06F 11/206
USPC ........................................................ 345/440
See application file for complete search history.

(56) References Cited

U.S. PATENT DOCUMENTS

| | | |
|---|---|---|
| 6,839,730 B1 | 1/2005 | Ramabhadran |
| 7,117,490 B2 | 10/2006 | Harrison, III et al. |
| 7,606,893 B2 | 10/2009 | Petrov et al. |
| 7,712,024 B2 | 5/2010 | Reynar et al. |
| 7,739,553 B2 | 6/2010 | Bendapudi et al. |

(Continued)

OTHER PUBLICATIONS

"IBM Watson Health Announces Collaboration to Study the Use of Blockchain Technology for Secure Exchange of Healthcare Data," Gale Group Trade &Industry, 2017, 3 pages.

(Continued)

*Primary Examiner* — Hai Tao Sun
(74) *Attorney, Agent, or Firm* — Amin, Turocy & Watson, LLP

(57) ABSTRACT

Techniques facilitating using a distribution system for incentivizing and accelerating data driven scientific research are described herein. The distribution system can track the input of various parties involved in scientific research, and when a reward, monetary or otherwise, is realized for one or more outcomes of the scientific research, the distribution system can distribute the reward among the parties that provided the input. The relative levels and contributions of the parties can be tracked to ensure that an equitable portioning of the reward is realized. A directed graph can be formed based on the transactions, wherein the nodes correspond to entities, researchers, publications, and the edges correspond to relationships between the entities. The directed graph can be analyzed to determine the relative or absolute levels of contributions from each of the entities, and the rewards can be distributed based on the contribution levels.

18 Claims, 10 Drawing Sheets

(56) References Cited

U.S. PATENT DOCUMENTS

| | | | |
|---|---|---|---|
| 7,957,876 | B2 | 6/2011 | Shiiba et al. |
| 8,021,221 | B2 | 9/2011 | Lydon et al. |
| 8,359,584 | B2 | 1/2013 | Rao et al. |
| 8,475,251 | B2 | 7/2013 | Lydon et al. |
| 8,516,045 | B2 | 8/2013 | Ordille et al. |
| 8,537,160 | B2 | 9/2013 | Hargrove et al. |
| 8,578,389 | B1 | 11/2013 | Boucher |
| 8,990,792 | B2 | 3/2015 | Gorelkina |
| 9,158,838 | B2 | 10/2015 | Peoples et al. |
| 9,201,659 | B2 | 12/2015 | Dhurjati et al. |
| 9,405,854 | B2 | 8/2016 | Jerzak et al. |
| 9,436,507 | B2 | 9/2016 | Mishra et al. |
| 9,612,807 | B2 | 4/2017 | de Lima Ottoni |
| 9,652,286 | B2 | 5/2017 | Fan |
| 2004/0001099 | A1 | 1/2004 | Reynar et al. |
| 2004/0264367 | A1 | 12/2004 | Edwards |
| 2006/0224974 | A1 | 10/2006 | Albrecht et al. |
| 2006/0229931 | A1 | 10/2006 | Fligler et al. |
| 2009/0281830 | A1 | 11/2009 | McNames et al. |
| 2013/0055221 | A1 | 2/2013 | Murthy et al. |
| 2013/0085821 | A1* | 4/2013 | Douceur ............... G06Q 30/02 705/14.4 |
| 2014/0040275 | A1 | 2/2014 | Dang et al. |
| 2014/0058782 | A1 | 2/2014 | Graves, Jr. |
| 2014/0115565 | A1 | 4/2014 | Abraham et al. |
| 2015/0143339 | A1 | 5/2015 | Rajanna et al. |
| 2015/0180883 | A1 | 6/2015 | Aktas et al. |
| 2015/0235282 | A1 | 8/2015 | Kamath |
| 2015/0332283 | A1* | 11/2015 | Witchey ............... G06Q 30/018 705/3 |
| 2016/0012424 | A1 | 1/2016 | Simon et al. |
| 2016/0232032 | A1 | 8/2016 | Azvine et al. |
| 2016/0323109 | A1 | 11/2016 | McCoy et al. |
| 2017/0011095 | A1* | 1/2017 | Wang ............... G06F 17/30699 |
| 2017/0031676 | A1 | 2/2017 | Cecchetti et al. |
| 2017/0109144 | A1 | 4/2017 | Spoon |

OTHER PUBLICATIONS

Disclosed Anonymously, "Method of flexible group trading using blockchain and differential pricing," IP.com, 2016, 6 pages.

Tang, et al., "Reflecting on the DARPA Red Balloon Challenge," Communications of the ACM, vol. 54 No. 4, 2011, 8 pages.

Platforms are being developed in academia for fostering reproducibility in Science: reproduciblescience.org, last accessed May 8, 2017.

Office Action dated Jun. 8, 2018 for U.S. Appl. No. 15/842,384, 29 pages.

Office Action dated Sep. 21, 2018 for U.S. Appl. No. 15/842,384, 39 pages.

List of IBM Patents or Applications Treated as Related.

"Open Science Data Cloud," opensciencedatacloud.org, Last accessed Nov. 14, 2016, 5 pages.

Simmhan, Y., et al., "A Survey of Data Provenance in e-Science," ACM SIGMOD Record, Sep. 2005, vol. 34, No. 3, pp. 31-36.

Simmhan, Y., et al., "A Survey of Data Provenance Techniques," Technical Report IUB-CS-TR618, 2005, 25 pages.

Angelino, E., et al., "StarFlow: A Script-Centric Data Analysis Environment," International Provenance and Annotation Workshop, 2010, 15 pages.

Callahan, S. P., et al., "VisTrails: visualization meets data management," Proceedings of the 2006 ACM SIGMOD International Conference on Management of Data, 2006, pp. 745-747.

Brachman, R., et al., "Knowledge Representation and Reasoning," 2004, 413 pages, Elsevier, San Francisco, CA.

Davis, R., et al., "What is a knowledge representation?," AI Magazine, 1993, vol. 14, No. 1, pp. 17-33.

Minsky, M. "A Framework for Representing Knowledge," MIT-AI Laboratory Memo 306, Jun. 1974, 108 pages, http://web.media.mit.edu/~minsky/papers/Frames/frames.html.

Berners-Lee, T., et al., "The Semantic Web," Scientific American, May 17, 2004, vol. 284, 36 pages.

Spivak, D., et al., "Ologs: A Categorical Framework for Knowledge Representation," PLoS One, 2012, 22 pages.

Hind, M., "Pointer Analysis: Haven't We Solved This Problem Yet?" Proceedings of the 2001 ACM SIGPLAN-SIGSOFT Workshop on Program Analysis for Software Tools and Engineering, 2001, 8 pages.

Lienhard, A., "Dynamic Object Flow Analysis," 2008, 180 pages.

Lienhard, A., et al., "Taking an Object-Centric View on Dynamic Information with Object Flow Analysis," Computer Languages, Systems & Structures, 2009, vol. 35, No. 1, pp. 63-79.

Lienhard, A., et al., "Practical Object-Oriented Back-in-Time Debugging," European Conference on Object-Oriented Programming, 2008, 25 pages.

Pérez, F., et al., "IPython: A System for Interactive Scientific Computing," Computing in Science & Engineering, 2007, vol. 9, pp. 21-29.

Ragan-Kelley, M., et al., "The Jupyter/IPython architecture: a unified view of computational research, from interactive exploration to communication and publication," AGU Fall Meeting Abstracts, 2014, 2 pages.

Pedregosa, F., et al., "Scikit-learn: Machine Learning in Python," Journal of Machine Learning Research, 2011, vol. 12, pp. 2825-2830.

Gallo, G., et al., "Directed hypergraphs and applications," Discrete Applied Mathematics, 1993, vol. 42, pp. 177-201.

Knime, https://www.knime.org/, Last accessed Nov. 15, 2016, 1 page.

Orange, http://orange.biolab.si/, Last accessed Nov. 15, 2016, 9 pages.

"SPSS Modeler," IBM, http://www-03.ibm.com/software/products/en/spss-modeler, Last accessed Nov. 15, 2016, 2 pages.

RapidMiner, https://rapidminer.com/, Last accessed Nov. 15, 2016, 4 pages.

VisTrails, https://www.vistrails.org/index.php/Main_Page, Last accessed Nov. 15, 2016, 4 pages.

Google Documents, https://www.google.com/docs/about/, Last accessed Nov. 15, 2016, 8 pages.

SourceForge, https://sourceforge.net/, Last accessed Nov. 15, 2016, 3 pages.

GitHub, https://github.com/, Last accessed Nov. 15, 2016, 4 pages.

Kaggle, https://www.kaggle.com/, Last accessed Nov. 15, 2016, 4 pages.

Driven Data, https://www.drivendata.org/, Last accessed Nov. 15, 2016, 5 pages.

Dream Challenges, http://dreamchallenges.org/, Last accessed Nov. 15, 2016, 8 pages.

OpenML, http://www.openml.org/, Last accessed Nov. 15, 2016, 5 pages.

Domino Data Lab, https://www.dominodatalab.com/, Last accessed Nov. 15, 2016, 4 pages.

IBM Data Science Experience, http://datascience.ibm.com/, Last accessed Nov. 15, 2016, 7 pages.

Microsoft Azure Machine Learning, https://azure.microsoft.com/en-us/services/machine-learning/, Last accessed Nov. 15, 2016, 11 pages.

List of IBM Patents and Applications treated as related.

Non-Final Office Action received for U.S. Appl. No. 15/399,420, dated Feb. 21, 2019.

Non-Final Office Action received for U.S. Appl. No. 15/841,018, dated Mar. 29, 2019.

Non-Final Office Action received for U.S. Appl. No. 15/842,384, dated Mar. 28, 2019.

* cited by examiner

ACCELERATING DATA-DRIVEN SCIENTIFIC DISCOVERY

BACKGROUND

The subject disclosure relates to a system that generates directed graphs representative of a collaboration network and determines contributions of entities based on the directed graphs.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processors for blockchain formation are described. The disadvantages of the references discussed above in the background have been resolved with the features disclosed herein.

According to an embodiment, a system is provided. The system can comprise a memory that stores computer executable components and a processor that executes the computer executable components stored in the memory. The components can include a graphing component that generates a directed graph representing a collaboration network between research entities associated with an outcome, wherein the directed graph comprises nodes that are associated with the research entities, and edges between the nodes representing relationships between the research entities. The components can also include a collaboration component that determines a contribution of a research entity of the research entities to the outcome based on the directed graph.

In an embodiment a computer-implemented method can be provided. The method can include generating, by a device operatively coupled to a processor, a directed graph representing a scientific research process, wherein a node of the directed graph is associated with a research entity, and an edge of the directed graph is associated with a relationship between the research entity and another research entity. The method can further include determining, by the device, a contribution amount of the research entity to a scientific result of the scientific research process based on the directed graph.

According to yet another embodiment, a computer program product to determine contribution levels is provided. The computer program product can comprise a computer readable storage medium having program instructions embodied therewith. The program instructions can be executable by a processor and cause the processor to generate a directed graph representing a collaboration network between research entities associated with an outcome, wherein the directed graph comprises nodes that are associated with the research entities, and edges between the nodes representing relationships between the research entities. The processor can also determine a contribution of a research identity of the research entities to the outcome based on the directed graph.

DETAILED DESCRIPTION

Figure 1:
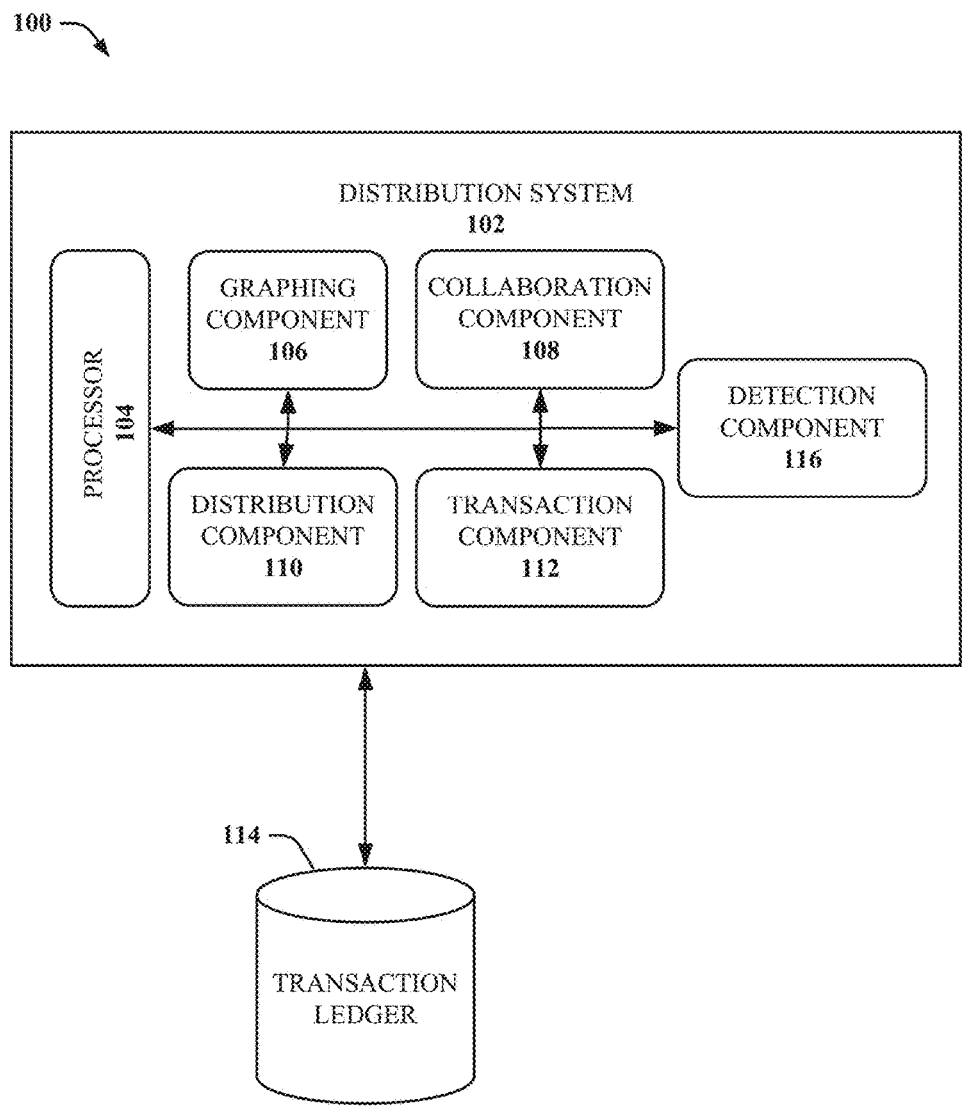
FIG. 1 illustrates a high-level block diagram of an example, non-limiting distribution system in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources wherein the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Currently, problems exist because there are limited platforms for incentivizing collaboration and sharing of time, efforts and data, as rewards are given just to entities that achieve an outcome (funding grant, monetary prize, etc). Others that may have contributed to the effort are not guaranteed to share in the reward, even though their contributions may have been important and necessary for the outcome to have been achieved.

In various embodiments disclosed herein, solutions address the above problems. For example, in various embodiments described herein, a distribution system for incentivizing and accelerating data driven scientific research is disclosed. The distribution system can track the input of various parties involved in scientific research (e.g., by the transaction ledger 114 and graphing component 106), and when a reward, monetary or otherwise, is realized for one or more outcomes of the scientific research, the distribution system can distribute the reward among the parties that provided the input (e.g., by the distribution component 110). The relative levels and contributions of the parties can be tracked to ensure that an equitable portioning of the reward is realized (e.g., by the collaboration component 108). The inputs can be tracked using a transaction database (e.g., transaction ledger 114), wherein transactions (publications, citations, patents, code sharing, data sharing, etc) can be tracked, and then a directed graph can be formed (e.g., by graphing component 106), wherein the nodes correspond to entities, researchers, publications, and the edges correspond to relationships between the research entities (e.g., data sharing, code sharing), publications (e.g., citations). The directed graph can be analyzed to determine the relative or absolute levels of contributions from each of the entities, and the rewards can be distributed based on the contribution levels (e.g., by collaboration component 108).

Turning now to FIG. 1, illustrated is a high-level block diagram 100 of an example, non-limiting distribution system 102 in accordance with one or more embodiments described herein. In FIG. 1, the distribution system 102 can include a processor 104, a graphing component 106, a collaboration component 108, a distribution component 110, a transaction component 112, and a detection component 116. In various embodiments, one or more of the processor 104, the graphing component 106, the collaboration component 108, the distribution component 110, the transaction component 112, and the detection component 1116 can be electrically and/or communicatively coupled to one another to perform one or more functions of the distribution system 102. The distribution system 102 can receive transaction and collaboration data from a transaction ledger 114.

In some embodiments, the distribution system 102 can be a cloud based system that facilitates the distribution of rewards and recognition of various steps and outcomes in the experimental/scientific research process. In other embodiments, distribution system 102 can be based on a network or device that is performing the data collection and analysis or is communicably coupled to the system executing the program.

In an embodiment, the transaction ledger 114 can record transactions between any number of different types of entities (including, but not limited to, research groups, researchers, institutions, and other entities involved in the scientific research process and/or arena). In some embodiments, the entity can be a computerized device that is associated with one or more of a research group, researcher, institution, or the like). The transactions can include the transmission/reception of data, sharing of data, transmission/reception of computer code, the sharing of computer code and other analytical efforts, cited art references in patent documents and other contributory transactions. The transaction can include citations in one publication that cite to work performed by other researchers as catalogued in other publications. Generally the transactions can be representative of the collaboration and contributions that different groups of entities make with other groups of entities.

In an embodiment, the transaction ledger 114 can be updated explicitly, e.g., by one or more devices (that may be associated with researchers, in some embodiments) transmitting information indicative of one or more updates. The information transmitted can be a recording of the collaborations and/or contributions of the entities. In another embodiment, the transaction ledger 114 can be updated implicitly by the transaction ledger 114 analyzing citations in publications, correspondences, and etc.

In at least one example embodiment, the transaction entries can be stored in the transaction ledger 114 as a blockchain. In some embodiments, the blockchain data structure for storing transaction entries can provide stability, and/or consistency of the data. Data can be generated and stored in blocks where each block (or, in some embodiments, one or more blocks) can contain a hash and a pointer to a previous block. Thus, changing one (past) block can then typically result in changing all subsequent blocks (with high probability). This also makes the blockchain substantially tamper proof, not allowing transactions (e.g., citations) to be artificially added. Consequently, blockchain data can provide an ideal data structure for tracking collaborations, citations, data sharing, etc.

Furthermore, in various embodiments, the blockchain ledger (and therefore the transaction ledger 114) can be distributed amongst many different entities of the distribution system 102. Since the blockchain is public, any entity of the distribution system 102 can easily verify any transaction given that the entities are known. Verifying transactions such as citations, code sharing, or a signed collaboration contract becomes easy. A researcher (or a device associated with a researcher) could, for example, share and/or transmit the researcher entity ID on the blockchain. Other devices and/or entities generally associated with the system can verify the citations or collaborations associated with the researcher entity ID. As another example, in an event in which government run funding agency devices employ use of the blockchain (cf. instantiation B), the distribution of the funds and/or the resulting government-funded work can be verified publicly. In some embodiments, the transaction ledger 114 can also be augmented with a system or device that can manage and/or verify identity. For example, in some embodiments, the augmented transaction ledger 114 can include a sign-up system that utilizes or requires verified academic e-mail addresses.

In an embodiment, the graphing component 106 can generate the directed graph based on entries from the transaction ledger 114 and blockchain. The nodes can be associated with the different entities (e.g., devices or research groups) associated with a research chain. For instance, a node in the directed graph can represent a paper/publication, programmer, scientist, research group, institution, or patent, while the directed edges of the directed graph can represent citations, computer code sharing, data/result sharing, or prior art. In one embodiment, the graphing component 106 can generate the directed graph by tracing the transactions, and whenever an entity is involved in a transaction with another entity, the two entities can be mapped as nodes, while the edge between the nodes can represent the transaction.

In some embodiments, the collaboration component 108 can analyze the directed graph. Based on the analysis of the directed graph, the collaboration component 108 can determine contribution amounts from each entity (or, in some embodiments, one or more entities) by determining the number of transactions, incoming and outgoing relative to other entities. For instance, in one embodiment, if a paper is cited once by a researcher that receives a prize, credit, or recognition, the researcher or entity associated with the paper can be determined to have a first contribution level. If the paper is cited multiple times, then the researcher or entity can have a second contribution level higher than the first level. The contribution level can be determined for each entity (or, in some embodiments, one or more entities) in the directed graph such that reward or recognition can be credited to each entity (or, in some embodiments, one or more entities) who may have contributed an idea, time, data, insight, or other element that facilitated the resultant paper.

In some embodiments, the collaboration component 108 can determine a collaboration link between two nodes of the network by a contract agreed upon in advance by the involved entities and added to the blockchain, or by analyzing available documents or computer code (e.g., citations in a paper). This contract can be verifiable, for example, by public data, public key signature, or through other mechanisms. In an embodiment the collaboration component 108 can suggest new collaborations between one or more different entities based on an analysis of the collaboration network, and/or control incentives to increase the level of collaboration, either automatically through a defined algorithm executed by a processor of a computer or device, or via human user intervention. In an embodiment, the collaboration component 108 can also output descriptive analytics and/or aggregate statistics of the transaction network (e.g., via user interface, application programming interface (API)).

In an embodiment, the collaboration component 108 can determine the relative importance of the collaboration or contribution for an entity based on an analysis of the directed graph (e.g., number and distribution of edges from other nodes). In some embodiments, the transaction ledger 114 can comprise information indicative of comments from the entities describing the importance of the contribution, or the reliance on the collaboration as a function of the scientific outcome. In some embodiments, the collaboration component 108 can also scour the publications for comments and/or notes indicating the importance of certain citations and other contributions. For instance, the "acknowledgements" section of publications can be analyzed, a level of importance of one or more contributions can be determined by the collaboration component. In some embodiments, the level of importance can be determined employing sentiment analysis. The importance of the contribution can then be used by the distribution component 110 to weigh the portion of the reward based on the importance of the contribution amount of the researcher.

Once a reward event (e.g., issuance or allocation of a monetary prize, recognition award, or publication, or selling of software) is triggered at an end-point of the directed graph, the distribution component 110 can automatically redistribute part of the reward throughout the network using a defined reward method based on the contribution levels determined by the collaboration component 108. By combining information about reward events and the structure of the network, the distribution component 110 can compute an overall reward distribution. In other embodiments, the distribution component 110 can recommend a reward distribution amount to be distributed by another system or entity.

In an embodiment, the transaction component 112 can check the consistency of a new transaction before accepting the transaction and adding it to the transaction ledger 114. The transaction consistency can be checked by matching a hash in a new entry to a hash of the previous transaction blocks to see if the hashes match.

In an embodiment, the detection component 116 can determine whether one or more entities are attempting to commit an act of deception, or artificially and misleadingly attempting to increase a contribution level relative to other entities. For instance, a research entity, when authoring a paper, can refer back to a prior work or to another entity many times unnecessarily in order to artificially increase the number of edges between the nodes to cause an appearance that one node has significant influence. The detection component 116 can track the number of citations back to self entities and to other entities and, if the number of citations, or edges formed back to other nodes is above a defined threshold, the detection component 116 can flag the contribution as potentially deceptive or otherwise inaccurate. In other embodiments, the detection component 116 can determine that no sharing of data or ideas has taken place even though references have been made to the collaboration in a research write-up or console log.

The distribution system 102 and/or the components of the distribution system 102 can employ hardware and/or software to solve problems that are highly technical in nature (e.g., use of blockchain technology, internet security, authentication, compression, big data analysis etc.), that are not abstract and that cannot be performed as a set of mental acts by a human. The distribution system 102 and/or components of the distribution system 102 can be employed to solve new problems that arise through advancements in technology (e.g., provenance of data, reliability/integrity of research which arises due to advancements in technology allowing third-party access to publications and potential tampering with electronic documents now stored in electronic database), computer networks, the Internet and/or the like.

A processor 104 can be associated with at least one of a central processor, a graphical processor, etc. In various embodiments, the processor 104 can be or include hardware, software (e.g., a set of threads, a set of processes, software in execution, etc.) or a combination of hardware and/or software that performs a computing task for machine learning (e.g., a machine learning computing task associated with received data). For example, the processor 104 can execute data analysis threads that cannot be performed by a human (e.g., are greater than the capability of a single human mind). For example, the amount of data processed, the speed of processing of the data and/or the data types processed by processor 104 over a certain period of time can be respectively greater, faster and different than the amount, speed and data type that can be processed by a single human mind over the same period of time. For example, data processed by processor 104 can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processor 104 can be fully operational towards performing one or more other functions (e.g., fully powered on, fully executed, etc.) while also processing the above-referenced data analysis data and runtime environment data.

Figure 2:
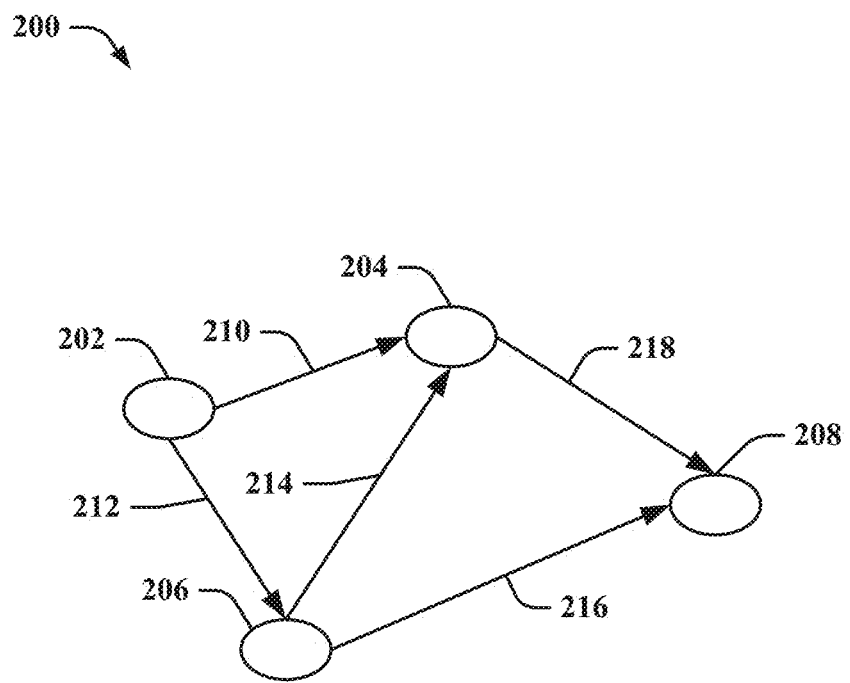
FIG. 2 illustrates another high-level block diagram of an example, non-limiting directed graph of a collaboration network in accordance with one or more embodiments described herein.

Turning now to FIG. 2, illustrated is another high-level block diagram of an example, non-limiting directed graph 200 of a collaboration network in accordance with one or more embodiments described herein.

In an embodiment, the directed graph created by the graphing component 106 can have a set of nodes 202, 204, 206, and 208 connected by directed edges 210, 212, 214, 216, and 218. The nodes can correspond to entities and other events associated with the research process and can be associated with devices for researchers or organizations, researchers, programmers, patents, publications, research groups, and other similar entities, while the edges can represent the relationships between the entities. In an embodiment, the edges 210, 212, 214, 216, and 218 can be directed edges, indicating that the relationship has a flow or represents a contribution from one party to another.

As an example, if nodes 202 and 206 are associated with publications, edge 212 can represent a citation in publication associated with node 206 to another publication associated with node 202, thus representative of a flow, or contribution from 202 to 206. If a paper associated with node 206 receives a prize, reward, funding, or recognition, either in part or in whole, the paper associated with node 202, and/or the authors of paper associated with node 202 can receive a portion of the reward based on their contribution, represented by edge 212. Similarly, if paper associated with 208 is associated with an outcome or result that wins recognition, or a reward, each of the papers and authors associated with the papers at nodes 206, 204, and 202 can receive credit in part as well, based on the contributions represented by edges 212, 214, 210, 216, and 218. In an embodiment, the amount of credit or reward that each paper is attributed with can be based on the contribution amounts (e.g., as determined by collaboration component 108) and/or can vary on the number of citations, citation chain, importance of each of the citations, explicit remarks (e.g., paper at node 208 says contribution provided by paper at 204 was very important to the result, etc.).

Figure 3:
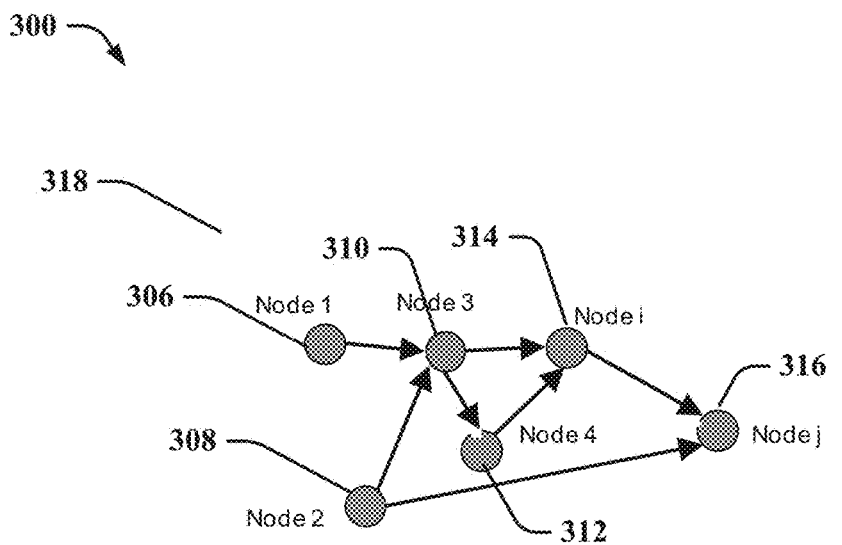
FIG. 3 illustrates another high-level block diagram of an example, non-limiting directed graph of a collaboration network and a blockchain ledger in accordance with one or more embodiments described herein.
Figure 3:
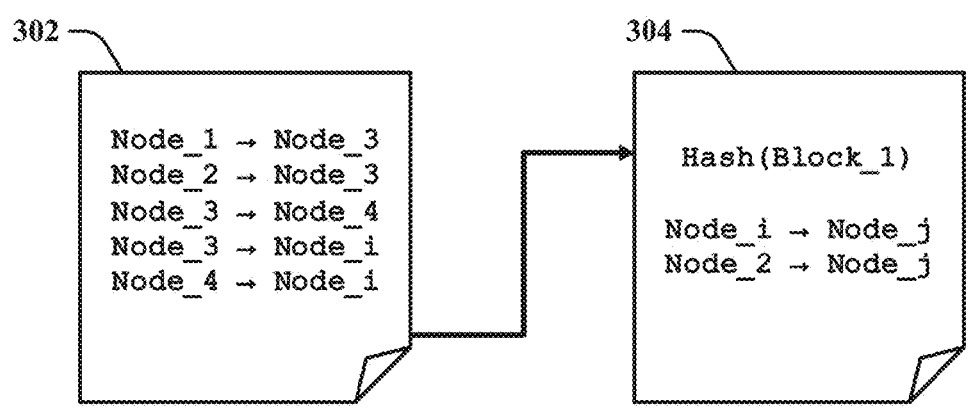

Turning now to FIG. 3, illustrated is another high-level block diagram 300 of an example, non-limiting directed graph 318 of a collaboration network and a blockchain ledger in accordance with one or more embodiments described herein. Repetitive description of like elements employed in other embodiments described herein is omitted for sake of brevity.

A blockchain ledger (e.g., stored in transaction ledger 114) can comprise blocks 302 and 304 that store the transaction details associated with the graph 318 where nodes 1, 2, 3, 4, and i (306, 308, 310, 312, and 314) and the relationships there between are stored in block 302. The transactions can be stored as a list e.g., where a contribution between node 1 306 and node 3 310 is stored, node 2 308 and node 3 310, and etc. Block 304 can represent later contributions where node i 314 contributes to node j 316, and node 2 308 contribute to node j 316. Block 304 can also comprise a hash of block 1 302 which is a mapping performed by a processor that maps data of an arbitrary size to data of fixed size, with each separate original block of data resulting in a unique hash value.

The transaction ledger blockchain can comprise a group of transaction blocks 302 and 304 that are linked to each other. Blocks are linked when hashes of previous blocks are included in the headers of subsequent blocks. Since each block can have a unique hash, a linked hash in the header is a reference back to a specific block, thus a blockchain of blocks. The master data block can comprise a first header and/or data from the data entry blocks. The header can further comprises a first time stamp representing when the data was collected or the master data block formed and/or uploaded to a public ledger. The header can also include an identifier that identifies a source of the data, and a first hash based on the data. The identifier can be a serial number associated with a research group or scientist, or can be associated with an apparatus that collects data (e.g., measurement device, etc).

Figure 4:
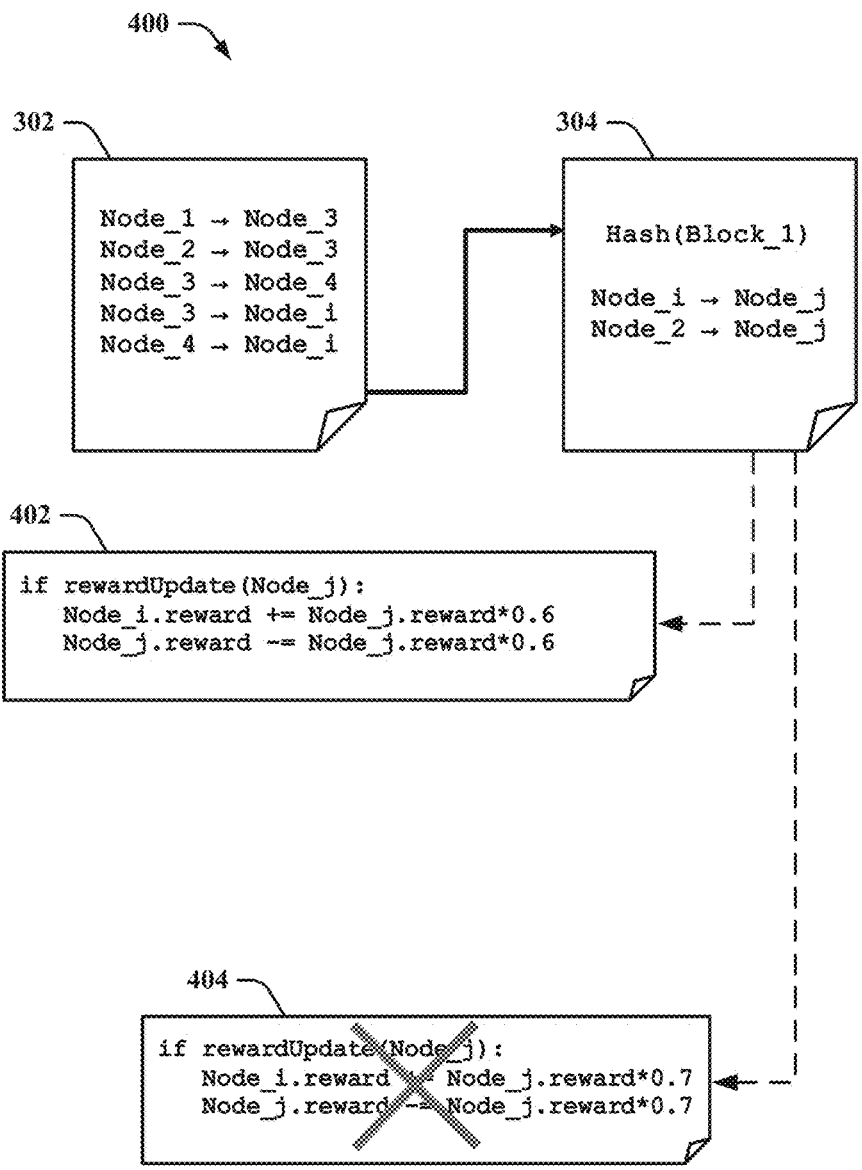
FIG. 4 illustrates another high-level block diagram of an example, non-limiting blockchain ledger with transactions being verified in accordance with one or more embodiments described herein.

Turning now to FIG. 4 illustrated is another high-level block diagram 400 of an example, non-limiting blockchain ledger with transactions being verified in accordance with one or more embodiments described herein. Repetitive description of like elements employed in other embodiments described herein is omitted for sake of brevity.

The transaction component 112 can perform checks on transaction entries before they are added to the blockchain formed by blocks 302 and 304. For instance, proposed transaction details in transaction 402 can be compared to the transaction details in blocks 302 and 304 to see if they are consistent with the existing transaction details. Similarly, the transaction details in proposed transaction block 404 can be compared with blocks 302 and 304, and the transaction component 112 can determine that transaction block 404 is inconsistent whereas transaction block 402 is consistent, leading to the addition of block 402 to the blockchain in the transaction ledger 114.

Figure 5:
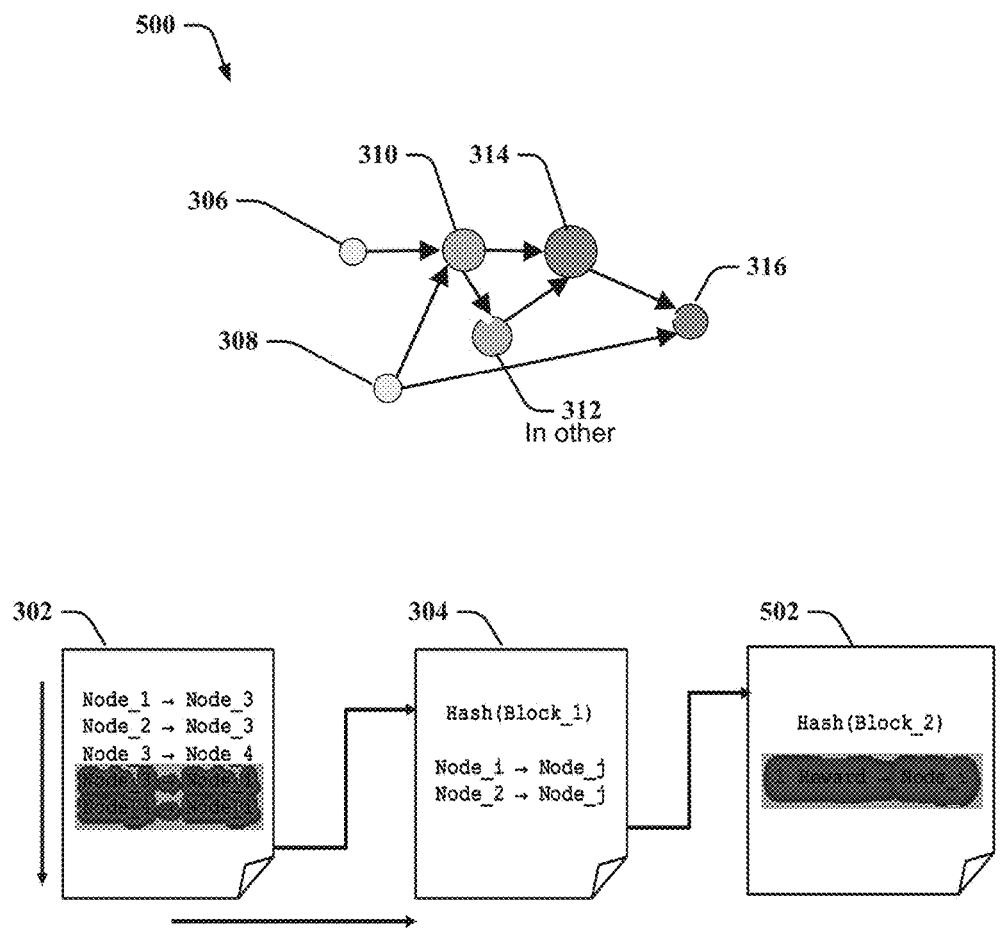
FIG. 5 illustrates another high-level block diagram of an example, non-limiting directed graph and blockchain ledger showing reward distributions in accordance with one or more embodiments described herein.

Turning now to FIG. 5, illustrated is another high-level block diagram of an example, non-limiting directed graph and blockchain ledger showing reward distributions in accordance with one or more embodiments described herein. Repetitive description of like elements employed in other embodiments described herein is omitted for sake of brevity.

If distribution component 110 determines that an outcome at node 314 has received a prize, the distribution component 110 can distribute a portion of the reward to each of the entities associated with nodes 310, 312, 306 and 308 that may have contributed to the award based on their contribution levels as determined by collaboration component 108.

As an example, distribution component 110 can receive transaction block 502 from the transaction ledger that indicates that Node i 314 has received 1 reward. The collaboration component 108 can then examine the directed graph formed by the graphing component 106 form the transaction blocks 302 and 304 to determine the relative contribution levels of each of nodes 306, 308, 310, and 312.

In an embodiment, each node can adds to the ledger the amount of credit assigned to the reference. The authors or entities associated with the nodes may choose to assign credit equally among the citations, or give a higher credit to specific references. For example, a math paper may assign significant credit to a paper that derived a key inequality used in a proof. An engineering paper may assign smaller credit to papers cited in a literature survey. An area review paper may assign equal credit to all citations. In this case, only the authors of the paper need to sign the entry added to the ledger block 302.

In an embodiment, if node 314 receives 1 credit, to determine the portion of the credit to be received by nodes 312, 310, 306, and 308, the following formula can be used where:

$$r(i \to j) = \frac{r(i)}{\alpha O(i)} \qquad \text{Eqn 1}$$

where r(i) is the reward of node 314. If node i cites j (node 310) registered as a transaction in the ledger block 302, then i assigns to j a reward of r(i→j) where α>1 is a fraction of the reward and O(i) is the number of documents cited by i. The reward that node i passes to k (node 306) in a network is given by:

$$r(i \to k) = \sum_{j \in P(k)} \frac{r(i \to j)}{\alpha O(i)} \qquad \text{Eqn 2}$$

where P(k) is the number of publications that cite publication k (publication at node 306). In other embodiments, the collaboration component 108 can determine the contribution level on the explicit importance as indicated by the researchers, or on other factors.

Figure 6:
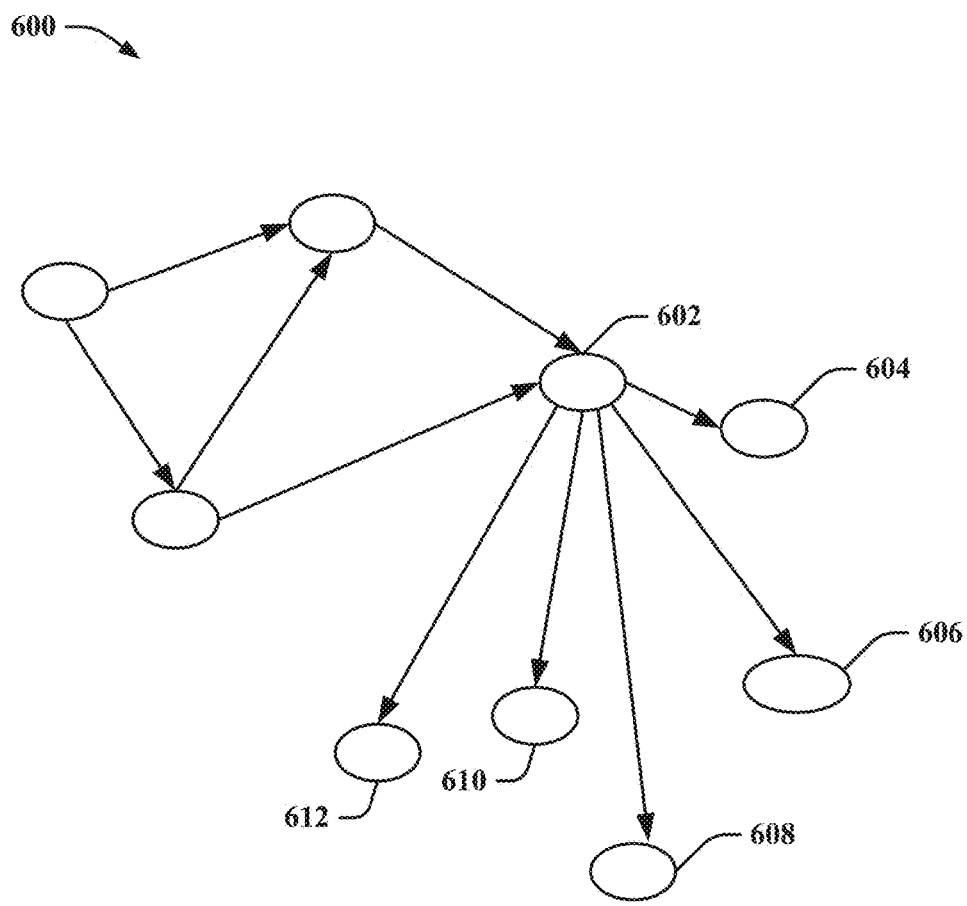
FIG. 6 illustrates another high-level block diagram of an example, non-limiting directed graph and blockchain ledger showing reward distributions in accordance with one or more embodiments described herein.

Turning now to FIG. 6, illustrated is another block diagram 600 of an example, blockchain in accordance with one or more embodiments described herein. Repetitive description of like elements employed in other embodiments described herein is omitted for sake of brevity.

In an embodiment, the distribution system 102 can incentivize false discovery mitigation. For example, if a research group (e.g., group 602) publishes a result of a study, the research group 602 and funding agency can incentivize other groups to duplicate the experiments to avoid false discoveries and/or confirm the results of the study. The research group can post on the transaction ledger 114 that other groups (up to a defined number) that verify the results will receive a part of the funding, and the script can be signed by both the funding agency and the research group. Once different groups (un)successfully duplicate results, research funds and credit can be transferred to the other groups. This system can allows more complex interactions between multiple agents (groups collaborating for validation), so the experiments can be shared among different groups.

The data can be shared via the ledger (e.g., stored in the blockchain) to allow the other groups (e.g., groups associated with nodes 604, 606, 608, 610, and 612) to gather data, analyze the data, and determine whether the results achieved by group 602 are correct. The collaboration component 108 can track the performance and ledger entries by the groups 604-612, and if the other groups arrive at conclusions either supporting or against the conclusion reached by group 602, then the distribution component 110 can apportion part of the money, credit, recognition, or reward assigned by 602 to the groups 604-612.

Figure 7:
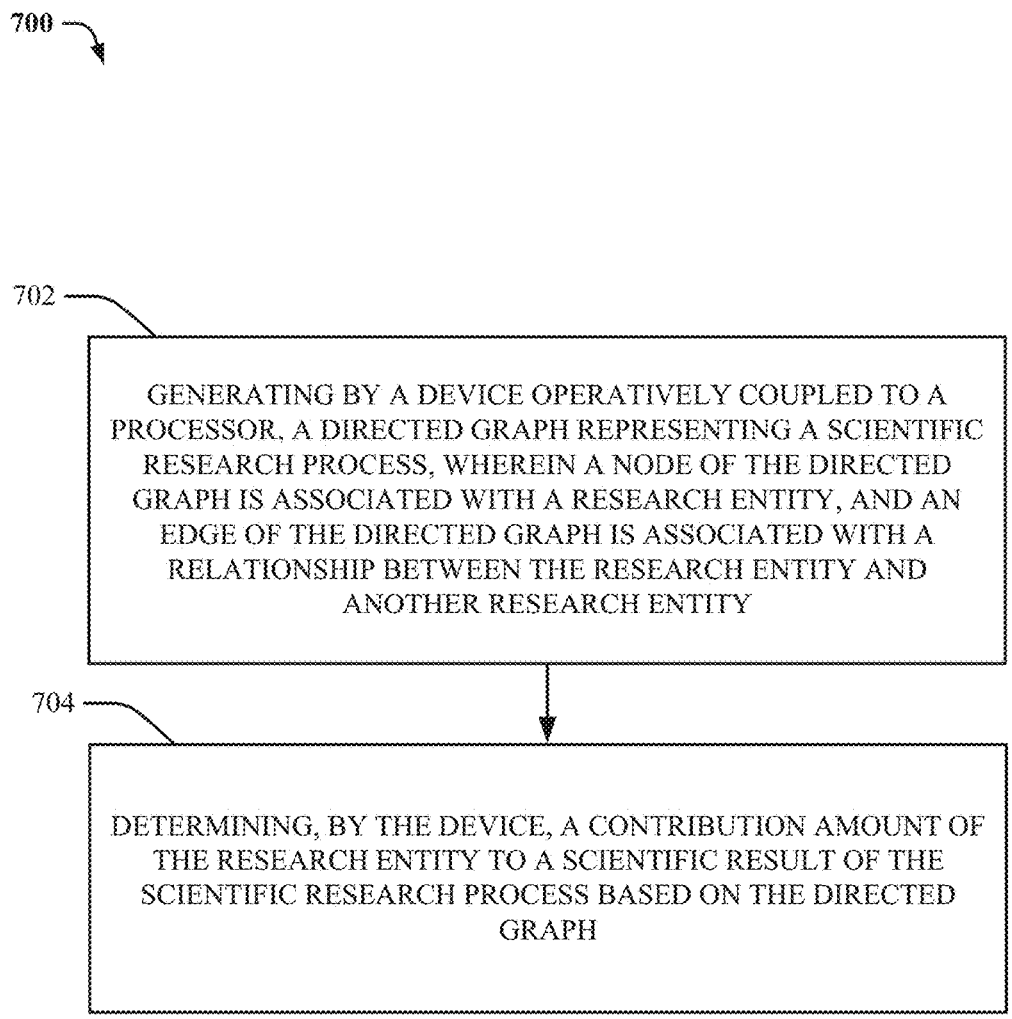
FIG. 7 illustrates a flow diagram of an example, non-limiting computer-implemented method for distributing rewards in accordance with one or more embodiments described herein.

Turning now to FIG. 7, illustrated is a flow diagram 700 of an example, non-limiting computer-implemented method for distributing rewards in accordance with one or more embodiments described herein. Repetitive description of like elements employed in other embodiments described herein is omitted for sake of brevity.

The method can begin at 702, where the method includes generating, by a device operatively coupled to a processor, a directed graph representing a scientific research process, where a node of the directed graph is associated with a research entity, and an edge of the directed graph is associated with a relationship between the research entity and another research entity (e.g., by graphing component 106).

The nodes can be associated with the different entities in the research chain. For instance, a node could be a paper/publication, programmer, scientist, research group, institution, or patent, while the directed edges could be citations, code sharing, data/result sharing, or prior art.

The method can continue at 704, where the method includes determining, by the device, a contribution amount of the research entity to a scientific result of the scientific research process based on the directed graph (e.g., by collaboration component 108).

In an embodiment, the determining can include analyzing the directed graph and determining contribution amounts from each entity. For instance, if a paper is cited once by a researcher that receives a prize, credit, or recognition, the researcher or entity associated with the paper can be determined to have a first contribution level. If the paper is cited multiple times, then the researcher or entity can have a second contribution level higher than the first level. The contribution level can be determine for each entity in the directed graph such that reward or recognition can be credited to each entity who may have contributed an idea, time, data, insight, or other element that facilitated the outcome.

In one embodiment, the determining can include determining a collaboration link between two nodes of the network by a contract pre-agreed by the involved parties and added to the blockchain, or by analyzing available documents/code (e.g., citations in a paper). This contract can be verifiable, for example, by publicly data, public key signature, or through other mechanisms. In an embodiment new collaborations can be suggested based on an analysis of the collaboration network, and control incentives to increase the level of collaboration, either automatically through a pre-programmed algorithm, or via human user intervention. In an embodiment descriptive analytics can be outputted and/or aggregate statistics of the transaction network (e.g., via user interface, API)

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a machine learning process (e.g., a semantic labeling process), transmit data that can include a sequence of bits corresponding to information generated during a machine learning process (e.g., a semantic labeling process), etc.

Figure 8:
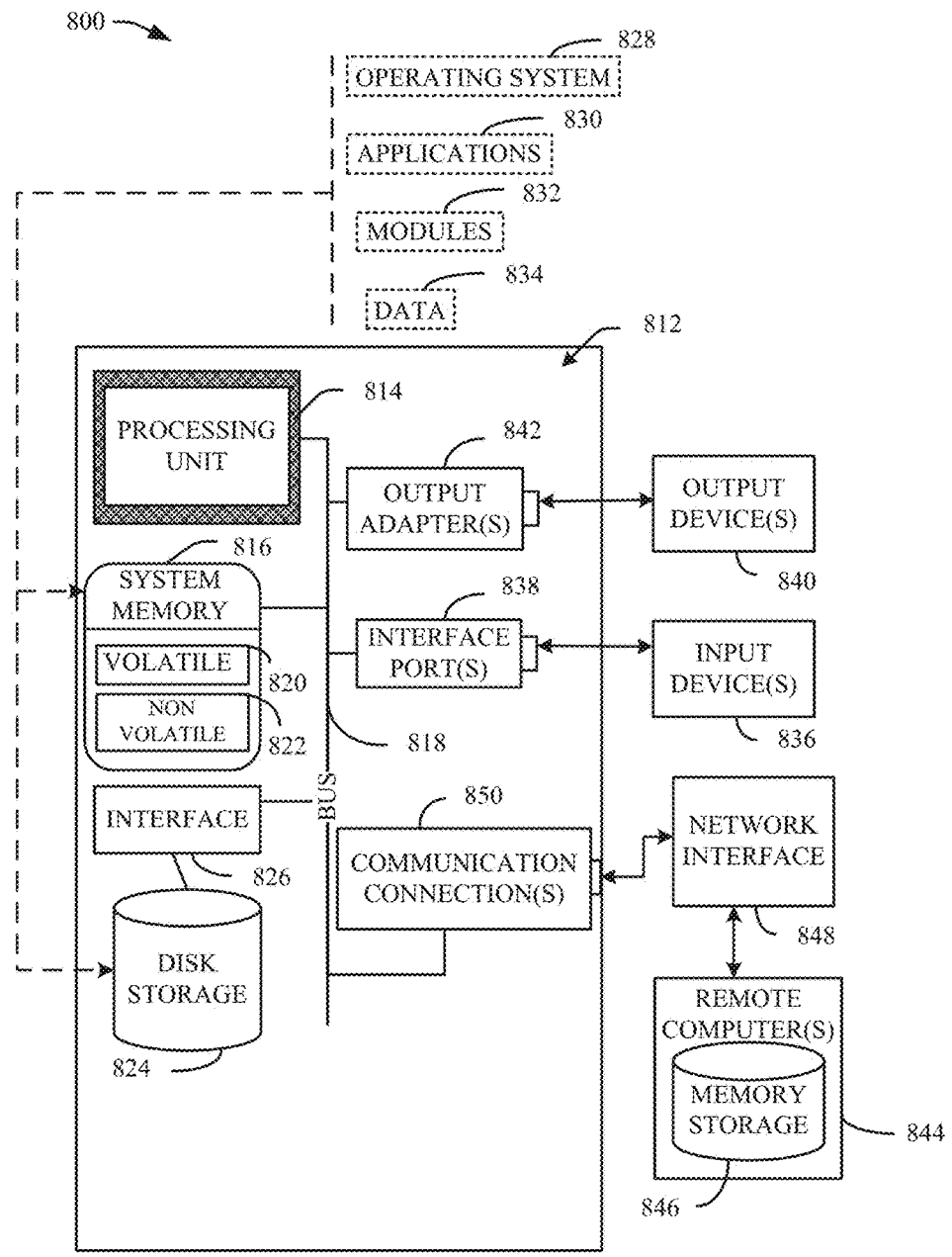
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jazz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. An entity enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
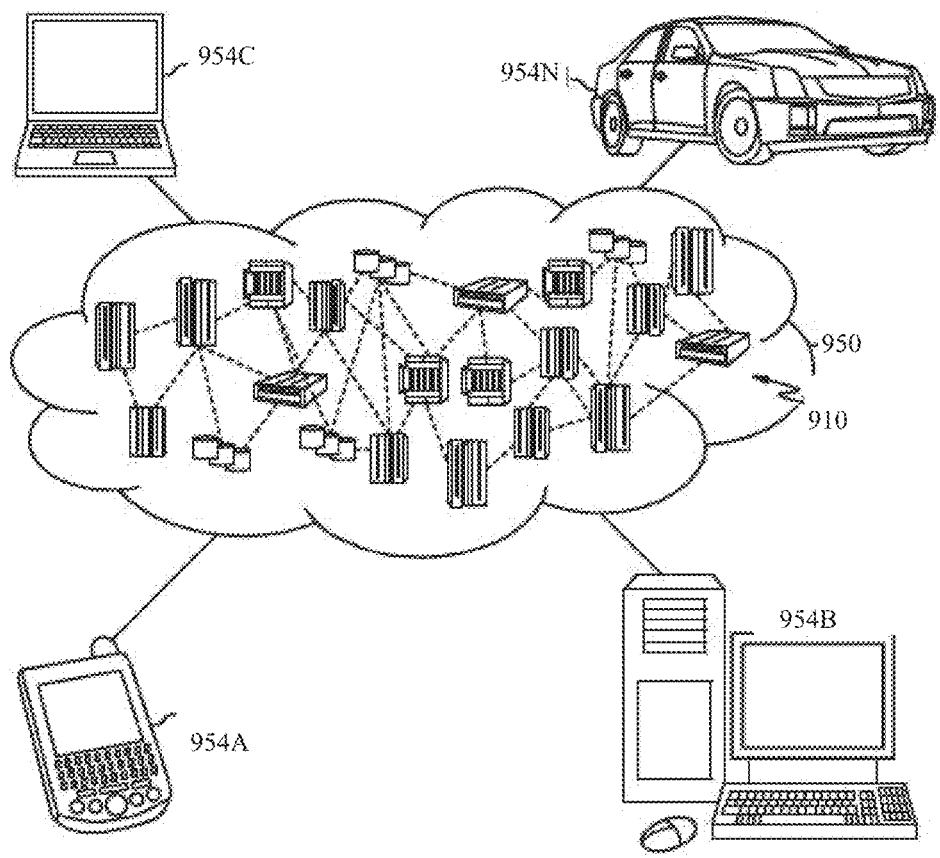
FIG. 9 illustrates a block diagram of an example, non-limiting cloud computing environment in accordance with one or more embodiments of the present invention.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
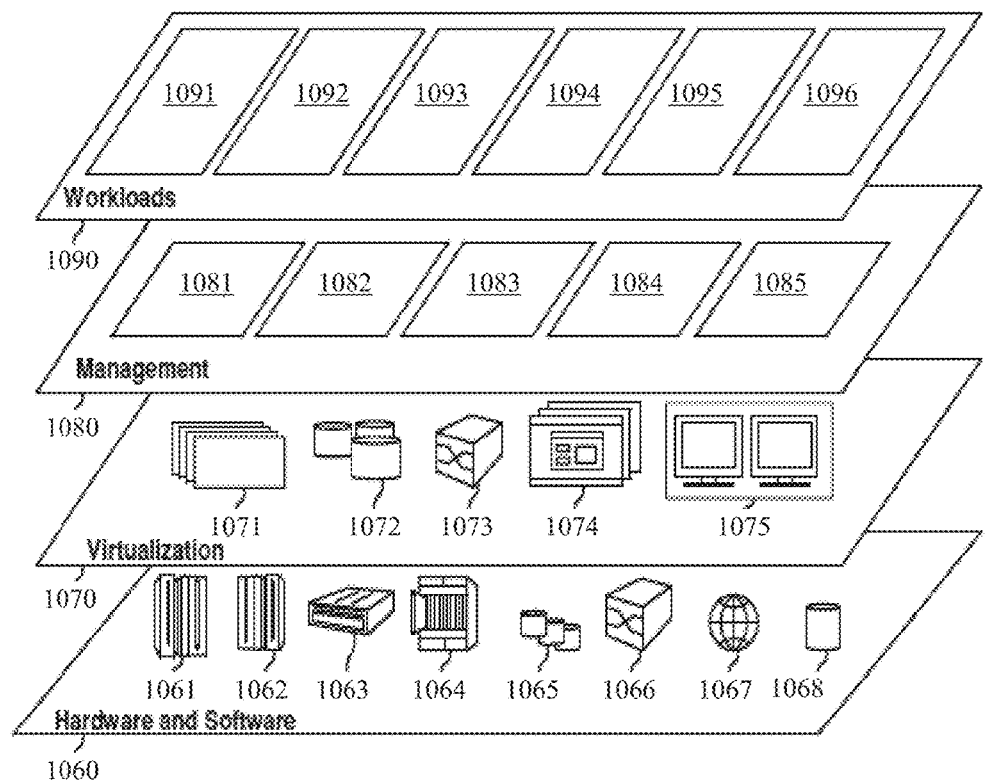
FIG. 10 illustrates a block diagram of example, non-limiting abstraction model layers in accordance with one or more embodiments of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and transaction model software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
      a graphing component that generates a directed graph representing a collaboration network between research entities associated with an outcome, wherein the directed graph comprises nodes that are associated with the research entities, and edges between the nodes representing relationships between the research entities; and
      a collaboration component that determines a contribution of a research entity of the research entities to the outcome based on the directed graph, wherein an entry of entries in a distributed ledger generated by the graphing component comprises transaction details between the research entities, and a description of a collaboration level between the research entities, wherein the collaboration component determines the contribution of the research entity based on an acknowledgement of the contribution from a research entity downstream in the directed graph, wherein the acknowledgement of the contribution is located in a section of a publication written by the research entity.

2. The system of claim 1, wherein the graphing component generates the directed graph based on the entries in the distributed ledger.

3. The system of claim 2, wherein the distributed ledger is a blockchain ledger.

4. The system of claim 2, wherein the computer executable components further comprise:
   a transaction component that determines whether transactions in the distributed ledger are consistent by comparing hashes of a subsequent transaction to a previous transaction.

5. The system of claim 1, wherein nodes of the directed graph are publications associated with the research entities and the edges of the directed graph are citations.

6. The system of claim 1, wherein the collaboration component determines the contribution of the research entity based on a distribution of edges throughout the directed graph.

7. The system of claim 1, wherein the computer executable components further comprise
   a distribution component that determines information indicative of a reward distributed to research entities based on the contribution of the research entity relative to a total contribution of each of the research entities.

8. The system of claim 1, wherein the computer executable components further comprise:
   a detection component that analyses the directed graph to determine whether the research entity is improperly increasing a number of edges connected to a node associated with the research entity.

9. A computer program product to determine contribution levels, the computer program product comprising a computer readable storage medium having program instructions embodied therewith, the program instructions executable by a processor to cause the processor to:
   generate a directed graph representing a collaboration network between research entities associated with an outcome, wherein the directed graph comprises nodes that are associated with the research entities, wherein an entry of entries in a distributed ledger generated by a graphing component comprises transaction details between the research entities, and edges between the nodes representing relationships between the research entities; and
   determine a contribution of a research identity of the research entities to the outcome based on the directed graph, wherein an entry of entries in a distributed ledger generated by the graphing component comprises a description of a collaboration level between the research entities, wherein the contribution is determined based on an acknowledgement of the contribution from a research entity downstream in the directed graph, and wherein the acknowledgement of the contribution is located in a section of a publication written by the research entity.

10. The computer program product of claim 9, wherein the generating comprises generating the directed graph based on the entries in the distributed ledger.

11. The computer program product of claim 10, wherein the distributed ledger is a blockchain ledger.

12. A system, comprising:
   a memory that stores computer executable components; and
   a processor that executes the computer executable components stored in the memory, wherein the computer executable components comprise:
      a graphing component that generates a directed graph representing a collaboration network between research entities associated with an outcome, wherein the directed graph comprises nodes that are associated with the research entities, wherein an entry of entries in a distributed ledger generated by the graphing component comprises transaction details between the research entities, and wherein an entry of entries in a distributed ledger generated by the graphing component comprises a collaboration level between the research entities; and
a collaboration component that determines a contribution of the research entity based on an acknowledgement of the contribution from a research entity downstream in the directed graph, wherein the acknowledgement of the contribution is located in a publication associated with the research entity.

13. The system of claim 12, wherein the distributed ledger comprises a blockchain ledger.

14. The system of claim 12, wherein the computer executable components further comprise:
a transaction component that determines whether transactions in the distributed ledger are consistent by comparing hashes of a subsequent transaction to a previous transaction.

15. The system of claim 12, wherein nodes of the directed graph represent publications associated with the research entities and the edges of the directed graph are citations.

16. The system of claim 12, wherein the computer executable components further comprise:
a collaboration component that determines a contribution of the research entity based on a distribution of edges throughout the directed graph.

17. The system of claim 12, wherein the computer executable components further comprise
a distribution component that determines information indicative of a reward distributed to the research entities based on a contribution of the research entity relative to a total contribution of each of the research entities.

18. The system of claim 12, wherein the computer executable components further comprise:
a detection component that analyses the directed graph to determine whether the research entity is improperly increasing a number of edges connected to a node associated with the research entity.

* * * * *